G. W. BRYANT.
TIRE TOOL.
APPLICATION FILED AUG. 17, 1912.

1,093,825.

Patented Apr. 21, 1914.
2 SHEETS—SHEET 1.

Witnesses
Frank H. Vick Jr.
L. R. Fox

Inventor
George W. Bryant
By Arthur L. Kent
his Atty.

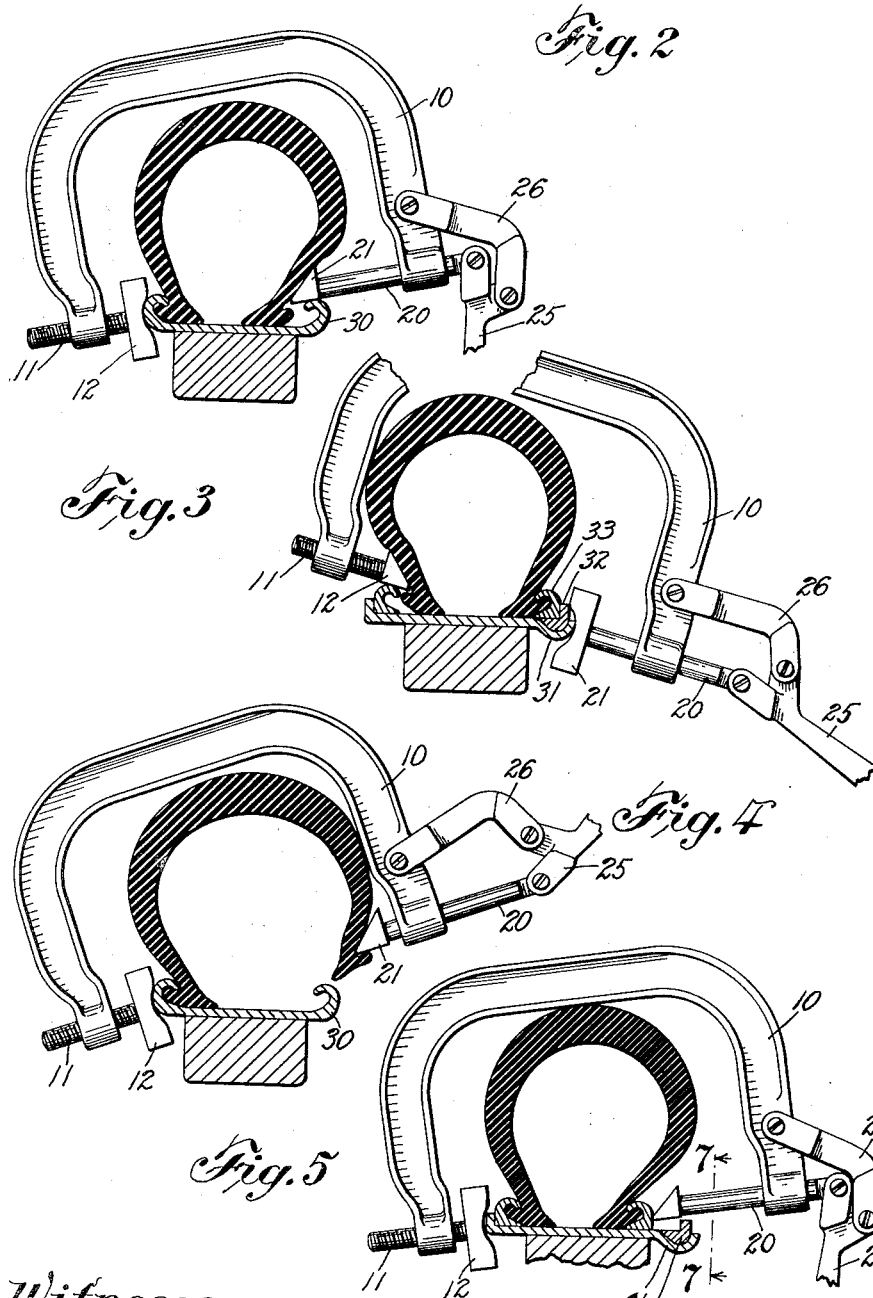

UNITED STATES PATENT OFFICE.

GEORGE W. BRYANT, OF NEW YORK, N. Y.

TIRE-TOOL.

1,093,825.   Specification of Letters Patent.   Patented Apr. 21, 1914.

Application filed August 17, 1912. Serial No. 715,561.

*To all whom it may concern:*

Be it known that I, GEORGE W. BRYANT, a citizen of the United States, residing at New York city, county of Queens, and State of New York, have invented certain new and useful Improvements in Tire-Tools, fully described and represented in the following specification and the accompanying drawings, forming a part of the same.

This invention relates to a tool for removing and replacing pneumatic tires of automobiles or other vehicles.

The invention aims to provide a tool which shall be adapted for use in performing various operations in connection with the removing of such tires of the clencher type from and in attaching them to rims of various styles or types, and to provide such a tool of general adaptability which shall be convenient to use, powerful in operation and readily and quickly adjustable for the various operations it is adapted to perform and for different sizes and styles of tires and rims.

To these ends the invention consists in the combination and arrangement of parts in a tool of the class referred to as hereinafter described and specifically pointed out in the claims.

As a full understanding of the invention can best be given by a detailed description of an approved form of tool embodying the various features of the invention in connection with drawings showing such a tool and illustrating ways of using it, such a description will now be given in connection with the accompanying drawings, in which—

Figure 1:
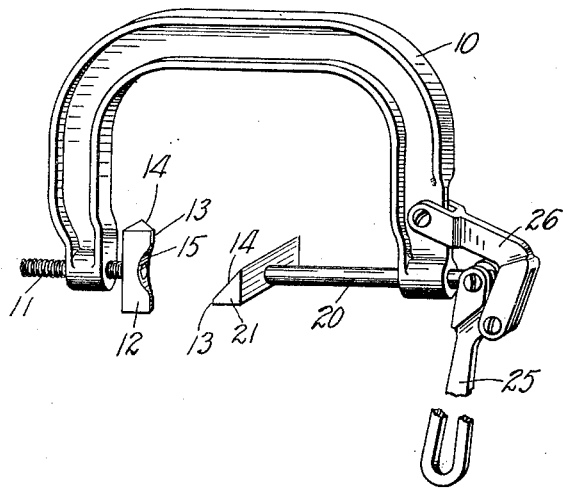
Figure 6:
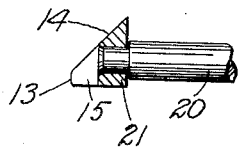
Figure 7:
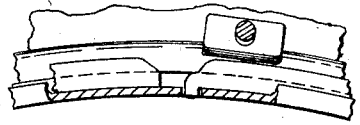
Figure 8:
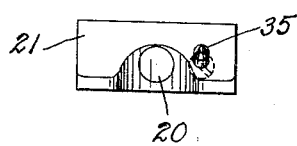
Figure 9:
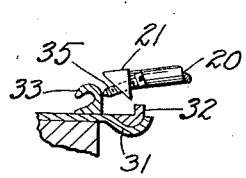

Figure 1 shows in perspective such a tire removing and replacing tool made in accordance with the invention. Figs. 2, 3, 4, and 5 illustrate several uses of the tool in connection with tires and rims shown in cross-section. Fig. 6 is an enlarged detail sectional view showing one of the engaging members of the tool. Fig. 7 is a broken side view partly in section as indicated by the line 7 on Fig. 5. Fig. 8 is a view of one of the engaging members provided with an engaging pin hereinafter referred to. Fig. 9 is a broken view showing the use of the tool with the engaging pin in operative position.

Referring to the drawings, the body of the tool shown is formed by a yoke or frame 10 of bowed or U shape and which will best be of a size sufficiently large to extend about a tire of the size with which the tool will ordinarily be used. One end of the yoke is formed with a threaded opening to receive a threaded rod or screw stem 11 which carries at its inner end an engaging member or head 12 which is formed by a metal or other suitable block secured to extend transversely of the threaded stem 11 and having a somewhat blunt engaging edge 13 and an engaging face 14 slanting backward from the edge 13. The outer portion or edge of the block is also formed with a central notch or concavity 15 for engaging the wheel rim when the block or engaging member is set transversely of the rim in the position shown in Fig. 1, and as shown in Figs. 2, 4 and 5. The other end of the yoke is also formed with an opening or guideway in which is mounted a slide rod 20 which carries at its inner end an engaging member or head 21 similar to the engaging member 12, being formed by a block set transversely of the rod 20 and having an engaging edge 13 and a backwardly slanting engaging face 14 and a central rim-engaging notch or recess 15. The member 21 is swiveled on the end of the rod 20 so that it may be adjusted or swung around to stand transversely to, or longitudinally of, the wheel rim and edge of the tire. The rod 20 is moved longitudinally to throw the head 21 toward or away from the head 12 by operating means consisting in the construction shown of an operating handle or lever 25 which is pivotally connected at its inner end to the outer end of the rod 20 and is also pivotally connected near the point of pivotal connection to the rod to one end of a swinging fulcrum link 26 the other end of which link is pivotally connected to the yoke 10 at a point adjacent to the opening or guideway through which the rod 20 passes. The link is so proportioned and the pivotal points so relatively located that by throwing the handle around from the position shown in Fig. 4 to that shown in Figs. 1 and 5 the rod 20 and engaging head 21 will be thrown inward to the full extent of their desired inward movement, and that when the handle 25 has been thrown all the way around to the position shown in Figs. 1 and 5 the line connecting the axes of pivotal connection of the link to the yoke and to the lever will have crossed the axis of pivotal connection of the lever with the rod 20 so that the rod 20 and the engaging head 21 will then be locked in position against outward movement under pressure on the engaging head.

In using the tool, the engaging head 12 will be adjusted toward or from the opposite side of the yoke to the proper position according to the width of the wheel rim from which the tire is to be removed or to which it is to be attached, and will be set to extend horizontally of the rim or transversely thereto according to the way in which the tool is to be used; and the engaging head 21 will also be set to extend horizontally of or transversely to the wheel rim, its position for most if not all uses of the tool being at right angles to the position of the engaging head 12.

The tool will usually be placed with the yoke extending outside of and about the tire instead of being placed inside the rim and between the spokes of the wheel. In this position the tool may be readily shifted from one position to another along the tire without interference with the wheel spokes. But it may be used inside of the rim and between the spokes if the workman prefers to so use it.

For giving a clear idea of how the tool may be used, I have shown several specific uses of the tool in Figs. 2 to 5.

Fig. 2 illustrates the use of the tool for breaking the tire away from the outer edge of the rim and for removing the tire from a solid clencher rim. In using the tool for breaking the tire away from the outer edge of the rim, the engaging head 12 being properly adjusted, the tool is placed in position as shown with the engaging head 12 resting against the inner edge of the rim 30. Then by throwing the handle 25 around to force the engaging head 21 inward and causing the head 21 to engage the tire just beyond the outer edge of the rim 30, the edge of the tire at and adjacent to the engaging head 21 will be forced inward away from the outer edge of the rim; the handle 25 is then thrown back again to retract the head 21 and the tool is slid along over the tire a short distance and the operation repeated, and this will be continued all away around the tire until the outer edge of the tire has been all freed from the rim so that this edge of the tire is then ready for the removing operation. For breaking the inner edge of the tire away from the rim, the tool is used in the same general position, that is, with the yoke set handle end out, but the engaging head 21 is turned into its rim engaging position and the head 12 is turned to extend longitudinally of the edge of the rim and tire so as to act as a tire-engaging member. The operation is the same as before except that the yoke is slanted so as to bring the engaging head 12 above the inner edge of the rim when the head 21 is in engagement with the outer edge of the rim.

Fig. 3 illustrates this operation on a tire mounted on a so-called quick-detachable rim. Fig. 2 also illustrates, as before stated, the use of the tool for removing a tire from a solid rim. The tool having been placed with the engaging head 12 set in engagement with the inner edge of the rim and with the head 21, turned to serve as a tire engaging member, engaging the tire just above the outer edge of the rim, and the handle 25 having been thrown around to locking position as shown, the tire will be held with a part of its outer edge adjacent to the head 21 thrown in away from the rim, so that with an ordinary tire iron or other suitable tool the outer edge of the tire may then be lifted out all the way around clear of the outer edge of the rim.

Fig. 4 illustrates the use of the tool for placing a tire on an ordinary, or solid, clencher rim. The tool is placed in position as shown with its engaging head 12 set transversely to and in engagement with the inner edge of the rim and with its engaging head 21 engaging the outer edge of the tire. Then by throwing the operating handle around from the position shown to its locking position the edge of the tire at and near the head 21 will be thrown inward beyond the edge of the rim and held there so that the edge of the tire may then be worked in with tire irons or other suitable tools in the usual way.

Fig. 5 illustrates the use of the tool for removing a tire from a quick-detachable rim of a well known type in which the outer side ring of the rim is held in position on the rim base 31 by means of an L-shaped split locking ring 32 which fits into a groove in the rim base. In using the tool for removing a tire from a rim of this kind as shown in Fig. 5, the tool is placed in position with the yoke extending over and about the tire, and the engaging head 12, adjusted to proper position and set to stand transversely of the rim, is placed against the inner edge of the rim and the engaging head 21, set to extend longitudinally of the rim and with its slanting engaging face 14 away from the rim, is brought into engagement with the outer side ring 33 of the tire close above the edge of the locking ring 32. Then by throwing the operating handle of the tool farther around and into locking position as shown, the side ring 33 is forced inward beyond the inner edge of the locking ring 32 and held in this position. The tool will be positioned circumferentially of the rim adjacent to the point of meeting of the ends of the split locking ring, as shown in Fig. 7 so that when the side ring 33 has been forced inward and is held as shown in Fig. 5 one of the ends of the locking ring may be lifted out of place and the whole ring then removed in the usual manner ner, and, the tool having been removed, the side ring is then free to be slipped off.

It will be seen that, in whichever of the foregoing ways the tool is used, one of its terminals presses upward and inward against the unyielding rim, while the other terminal presents to the yieldable-tire an engaging portion which will not cut or otherwise injure the tire, and which will press inwardly and downwardly against it in such a way that the tire can not escape from the tool, but will be effectually controlled thereby, and may, through the use of the tool, be removed from the rim or replaced as the workman desires. In this way, I secure a tool which, with the same terminals, may optionally engage either the yieldable tire or the unyielding rim efficiently and without injury to either, and with which the various operations of removing or putting on a flexible tire may all be performed from the outside of the wheel without the trouble or necessity of changing the tool over from side to side of the wheel.

For some purposes, as for removing a tire of a size too large for the yoke 10 from a quick-detachable rim of the type shown in Fig. 4, I find it desirable to provide the engaging head 21 with an engaging device adapted to be brought into holding engagement with the outer side ring 33, for example, when the tool is set in position with the yoke inside the wheel felly and rim between the wheel spokes. For this purpose I provide the engaging head 21 with a retractable engaging pin 35 (see Figs. 8 and 9) formed by a threaded pin or screw extending through a threaded opening in the head 21 from the rear face thereof to project through and beyond the inclined engaging face 14. This screw or engaging pin is made of hard metal and with a sufficiently sharp point to hold its position against the side ring 33, when the tool is used, for example, as shown in Fig. 9. When not in use, the screw pin is retracted so as not to project beyond the face 14 of the head 21.

The manner of using the tool with other styles or modifications of rims will be obvious and other uses of the tool will readily suggest themselves.

It is to be understood that the invention is not to be limited to the exact construction and arrangements of parts in the particular tool shown and to which the foregoing description has been mainly defined, but that it includes changes and modifications thereof within the claims.

What is claimed is:—

1. A tool, for yieldable tires, embodying a yoke, members carried thereby each provided with a terminal having a tire engaging factor and a rim engaging factor, said terminals being adjustable to operatively present either of said engaging factors, and means for diminishing the distance between said terminals.

2. A tool, for yieldable tires, embodying a yoke, members carried thereby each provided with a terminal having a tire engaging factor and a rim engaging factor, said terminals being adjustable to different angles to operatively present either of said engaging factors, and means for diminishing the distance between said members.

3. A tool for yieldable tires, embodying a yoke, members carried thereby each provided with a terminal having a tire engaging factor and a rim engaging factor, said terminals being adjustable to operatively present either of said engaging factors, a side-ring engaging device carried by one of said terminals and retractable relatively thereto, and means for diminishing the distance between said members.

4. A tool for yieldable tires, embracing in combination a yoke, members carried thereby each provided with a terminal embodying a rotatable, blunt-edged prism adapted to engage a tire, said prism being provided with a transverse recess in its edge adapted to engage a wheel rim, and means for diminishing the distance between said members.

In testimony whereof, I have hereunto set my hand in the presence of two subscribing witnesses.

GEORGE W. BRYANT.

Witnesses:
M. E. McNinch,
A. L. Kleet.